(12) United States Patent
Shapiro (10) Patent No.: US 8,150,668 B2
(45) Date of Patent: Apr. 3, 2012

(54) THERMAL FLUID-STRUCTURE INTERACTION SIMULATION IN FINITE ELEMENT ANALYSIS

(75) Inventor: Arthur B. Shapiro, Livermore, CA (US)

(73) Assignee: Livermore Software Technology Corporation, Livermore, CA (US)

(*) Notice: Subject to any disclaimer, the term of this patent is extended or adjusted under 35 U.S.C. 154(b) by 596 days.

(21) Appl. No.: 12/369,140

(22) Filed: Feb. 11, 2009

(65) Prior Publication Data

US 2010/0204963 A1 Aug. 12, 2010

(51) Int. Cl.
*G06F 9/455* (2006.01)
(52) U.S. Cl. .................. 703/9; 165/177; 422/198
(58) Field of Classification Search .......... 703/12, 703/6, 9; 165/177, 80.4; 99/453; 361/688; 422/198; 429/26; 219/629
See application file for complete search history.

(56) References Cited

U.S. PATENT DOCUMENTS

| | | | |
|---|---|---|---|
| 2004/0187707 A1* | 9/2004 | Nielsen et al. | 99/453 |
| 2005/0205241 A1* | 9/2005 | Goodson et al. | 165/80.4 |
| 2006/0153755 A1* | 7/2006 | Obuchi et al. | 422/198 |
| 2006/0283584 A1* | 12/2006 | Arana et al. | 165/177 |
| 2008/0140376 A1* | 6/2008 | Elgue et al. | 703/12 |
| 2008/0171249 A1* | 7/2008 | Arana et al. | 429/26 |
| 2009/0166352 A1* | 7/2009 | Azuma | 219/629 |
| 2009/0207564 A1* | 8/2009 | Campbell et al. | 361/688 |

OTHER PUBLICATIONS

Kashid et al., "CFD modeling of mass transfer with and without chemical reaction in the liquid-liquid slug flow microreactor", Chemical Engineering Science, 2007.*
Gorelick, S.M., "Large scale nonlinear deterministic and stochastic optimization: Formulations involving simulation of surface contamination", Mathematical programming, 1990.*
Harwell et al., "Effect of Micelle formation on Chromotographic movement of surfactant mixtures", The American Institute of Chemical Engineers, 1982.*
Green et al., "Fluid flow induced by nonuniform ac electric fields in elctrolytes on Microelectrodes. III. Observation of stream lines and numeical simulation", Physical review, 2002.*
Saha et al., "Combined free and forced convection inside a two-dimensional multiple ventilated rectangular enclosure", ARPN Journal of Engineering and Applied Sciences, 2006.*
Liu et al., "Gas-liquid catalytic hydrogenation reaction in small catalyst channel", American Institute of Chemical Engineers, 2005.*

* cited by examiner

*Primary Examiner* — Kandasamy Thangavelu
(74) *Attorney, Agent, or Firm* — Roger H. Chu (57) ABSTRACT

Simulation of thermal fluid-structure interaction using bulk flow fluid elements (BFFEs) is described. Each BFFE is configured to include the following characteristics: 1) at least one surrounding layer of solid elements representing either the surrounding structure or the pipe wall; 2) a layer of shell elements or Bulk Node Segments representing the outer boundary of the fluid; 3) a Bulk Node at the center of the BFFE for defining fluid properties (e.g., density, specific heat) and volume (i.e., fluid volume is calculated as the enclosed volume between the Bulk Node and all of the Bulk Node Segments that surround it); 4) a fluid flow beam element or Bulk Node Element for defining fluid flow path to another BFFE; and 5) a contact interface between the solid elements and the shell elements for conducting fluid-structure thermal interaction.

20 Claims, 7 Drawing Sheets

THERMAL FLUID-STRUCTURE INTERACTION SIMULATION IN FINITE ELEMENT ANALYSIS

FIELD OF THE INVENTION

The present invention generally relates to computer-aided engineering analysis for a structure (e.g., metal stamping tools), more particularly to, performing time-marching thermal fluid-structure interaction simulation of bulk flow fluid in a finite element analysis used for designing a structure.

BACKGROUND OF THE INVENTION

Finite element analysis (FEA) is a computer implemented method widely used in industry to model and solve engineering problems relating to complex systems such as three-dimensional non-linear structural design and analysis. FEA derives its name from the manner in which the geometry of the object under consideration is specified. With the advent of the modern digital computer, FEA has been implemented as FEA software. Basically, the FEA software is provided with a model of the geometric description and the associated material properties at each point within the model. In this model, the geometry of the system under analysis is represented by solids, shells and beams of various sizes, which are called elements. The vertices of the elements are referred to as nodes. The model is comprised of a finite number of elements, which are assigned a material name to associate with material properties. The model thus represents the physical space occupied by the object under analysis along with its immediate surroundings. The FEA software then refers to a table in which the properties (e.g., stress-strain constitutive equation, Young's modulus, Poisson's ratio, thermal conductivity) of each material type are tabulated. Additionally, the conditions at the boundary of the object (i.e., loadings, physical constraints, heat flux, etc.) are specified. In this fashion a model of the object and its environment is created.

FEA is becoming increasingly popular with automobile manufacturers for designing and optimizing many aspects of manufacturing of a vehicle such as aerodynamic performance, structural integrity, part manufacturing, etc. Similarly, aircraft manufacturers rely upon FEA to predict airplane performance long before the first prototype is ever developed. One of the popular FEA tasks is to simulate metal forming (e.g., sheet metal stamping or metal part forming)

Metal forming is referred to as a process of manufacturing of thin sheet metal parts or workpieces (e.g., fenders, channels, hub caps, stiffeners, etc.). It involves stretching, drawing and bending a sheet of metal into a desired shape using a hydraulic press 100 that includes at least one upper tool or punch 112 and one lower tool or die 114 shown in FIG. 1. Stamped metal parts 113 are created when the punch 112 is pressed onto the die 114 in a downward direction shown by arrow 110. Metal forming may also be referred to as a process of manufacturing metal fasteners such as bolts, screws or rivets. Many of the metal forming process require heat to soften the metal (e.g., sheet, bar, tube, wire, etc.) before pressure is applied to alter the shape of the metal to a desired shape.

Figure 1:
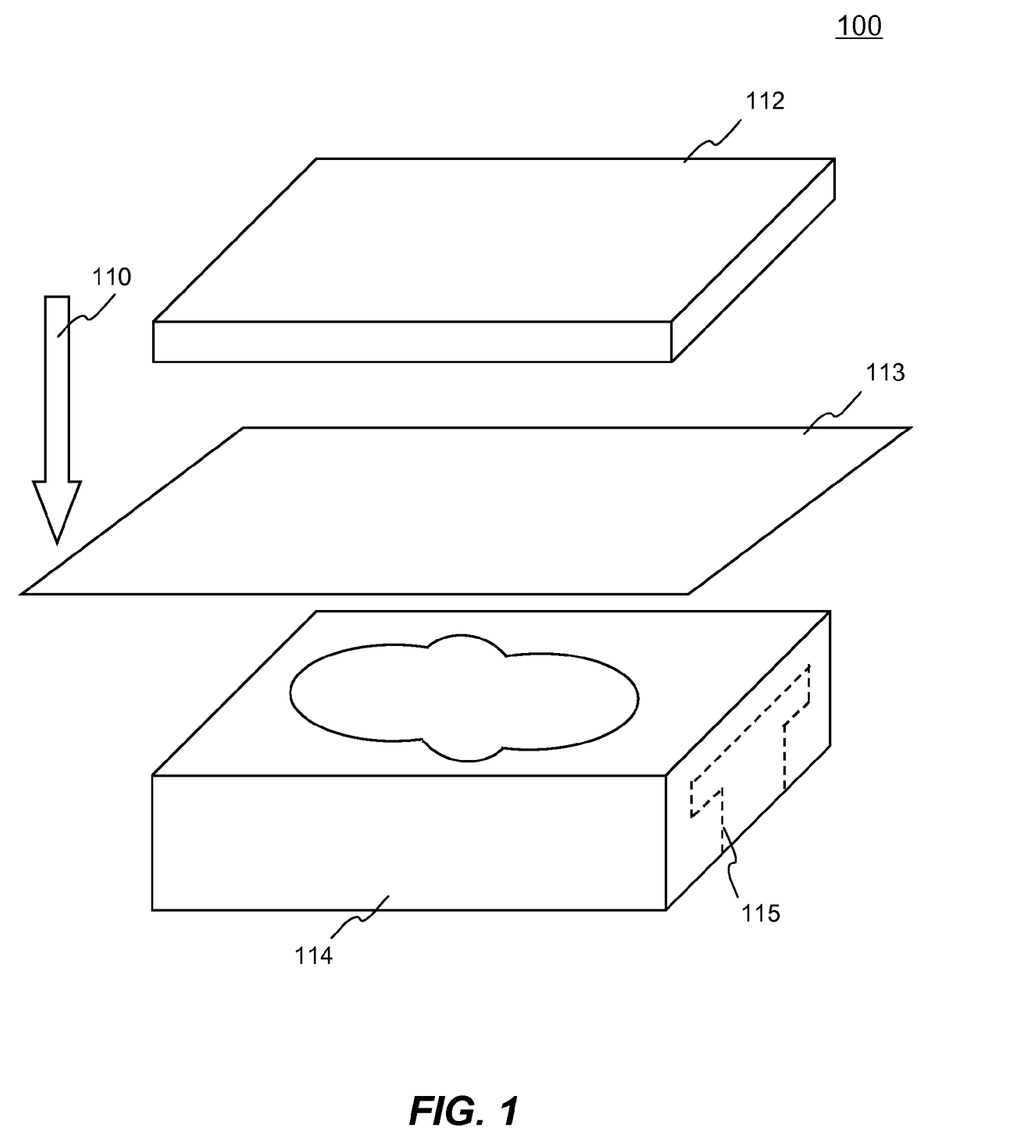
FIG. 1 is a perspective view of a metal forming press and a blank metal piece.

During hot metal forming process, the heat is transferred from the heated metal piece 113 to the die when the punch 112 is pressed to the die 114 each time. In producing certain metal parts, the die 114 needs to be cooled down to a particular temperature range after one or more presses. Instead of cooling naturally, using a cooling system can increase the cooling efficiency thus increasing productivity of the metal-forming press. Generally, faster cooling can be achieved with cooling fluids flowing through one or more cooling fluid passages 115, which generally are embedded inside the die 114. Certain arrangements or placements of the cooling fluid passages 115 would increase cooling efficiency thereby increasing productivity further. However, the die 114 is a very expensive to manufacture. Physical trial-and-error approaches to experimental determine the best arrangement of cooling passages is too costly.

Therefore, it would be desirable to have a computer implemented method of simulating thermal fluid-structure interaction of bulk flow fluid in finite element analysis used for designing a structure, for example, thermal interaction between cooling fluids and a die of a metal forming press.

BRIEF SUMMARY OF THE INVENTION

This section is for the purpose of summarizing some aspects of the present invention and to briefly introduce some preferred embodiments. Simplifications or omissions in this section as well as the abstract and the title herein may be made to avoid obscuring the purpose of the section. Such simplifications or omissions are not intended to limit the scope of the present invention.

The present invention discloses a system, method and software product for simulating thermal fluid-structure interaction of bulk flow fluids in finite element analysis used for designing a structure, for example, cooling of a die in hot metal forming process. According to one aspect of the present invention, bulk flow fluids used for cooling are placed in one or more fluid flow paths. In one example, the paths are embedded passages of a metal forming die. In another, the paths are enclosed in a pipe containing cooling fluid. Each of the fluid flow paths has an inlet and an outlet and each having an arbitrary shape and orientation in three-dimensional space there between. Cross-section of the fluid path comprises a simple closed two-dimensional geometric shape such as circle, ellipse, or polygon (e.g., triangle, quadrilateral, pentagon, etc.). A contiguous series of lumped homogeneous volume of fluid or fluid slugs is defined along each fluid flow path with each slug represents a portion of the bulk fluid contained therein. Each fluid slug can be modeled or represented by a bulk flow fluid elements (BFFE) described below.

According to another aspect, each BFFE is configured to include the following characteristics: 1) at least one surrounding layer of solid elements representing either the surrounding structure or the pipe wall; 2) a layer of shell elements or Bulk Node Segments representing the outer boundary of the fluid; 3) a Bulk Node at the center of the BFFE for defining fluid properties (e.g., density, specific heat) and volume (i.e., fluid volume is calculated as the enclosed volume between the Bulk Node and all of the Bulk Node Segments that surround it); 4) a fluid flow beam element or Bulk Node Element for defining fluid flow path to another BFFE; and 5) a contact interface between the solid elements and the shell elements for conducting thermal fluid-structure interaction.

According to yet another aspect, Bulk Node can be defined by known methods, for example, coordinate (x,y,z) in a Cartesian coordinate system in three-dimension space, where x, y and z are real numbers and coordinate (x,y,z) uniquely defines a point in space. Each Bulk Node Segment is either a quadrilateral or triangular surface area representing pipe wall or fluid passage surface, which surrounds the Bulk Node. Within a BFFE, heat exchange or thermal interaction between the Bulk Node and each of the Bulk Node Segments is through convection and radiation. Bulk Node Element associates one BFFE to another by connecting respective Bulk Nodes. This allows calculation of the conduction and advection thermal interaction or heat exchange between respective Bulk Nodes in the flow direction.

According to still another aspect, an initial boundary condition (e.g., temperature at certain locations) is defined before a simulation of thermal interaction of a structure containing one or more BFFEs can start. The simulation can be conducted using a time-marching or time-domain solution using a finite element analysis software module. In a time-marching solution, a plurality of solution cycles are performed starting at the initial time (e.g., t=0). At each subsequent solution cycle, the simulation time is advanced by a time increment ($\Delta t$). At each solution cycle, thermal interaction or heat exchange is calculated at each BFFE and between two connected BFFEs. The connected BFFEs are associated by the fluid flow beam element (i.e., Bulk Node Element).

According to one embodiment, the present invention is a method of designing a structure using a time-marching thermal fluid-structure interaction simulation in a finite element analysis. The method comprises at least the following: receiving a bulk flow fluid and path definition that includes one or more flow paths in the structure; defining a plurality of fluid slugs along each of the flow paths, the plurality of fluid slugs is represented by at least a first bulk flow fluid element (BFFE) and a second BFFE, wherein each of the first and second BFFEs comprises a set of thermal interaction characteristics pertinent to corresponding one of the fluid slugs, and the first BFFE and the second BFFE are connected to each other in flow direction of said each of the flow paths; and designing a desirable configuration of the structure based on finite element analysis results obtained by conducting a time-marching thermal interaction simulation of the structure at a plurality of solution cycles, wherein the finite element analysis results comprises effects from a first thermal interaction at said each of the first and second BFFEs and from a second thermal interaction between the first BFFE and the second BFFE at each of the solution cycles.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will be better understood with regard to the following description, appended claims, and accompanying drawings as follows:

DETAILED DESCRIPTION

In the following description, numerous specific details are set forth in order to provide a thorough understanding of the present invention. However, it will become obvious to those skilled in the art that the present invention may be practiced without these specific details. The descriptions and representations herein are the common means used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

To facilitate the description of the present invention, it deems necessary to provide definitions for some terms that will be used throughout the disclosure herein. It should be noted that the definitions following are to facilitate the understanding and describe the present invention according to an embodiment. The definitions may appear to include some limitations with respect to the embodiment, the actual meaning of the terms has applicability well beyond such embodiment, which can be appreciated by those skilled in the art:

FEA stands for Finite Element Analysis.

Implicit FEA or solution refers to Ku=F, where K is the effective stiffness matrix, u is the unknown displacement array and F is the effective loads array. F is a right hand side loads array while K is a left hand side stiffness matrix. The solution is performed at the global level with a factorization of the effective stiffness matrix, which is a function of the stiffness, mass and damping. One exemplary solution method is the Newmark time integration scheme. The thermal analog to the above, is that K is the effective conductance matrix, u is the unknown temperature array and F is the effective thermal load array. One exemplary solution method is the Crank-Nicolson time integration scheme.

Explicit FEA refers to Ma=F, where "M" is the diagonal mass array, "a" is the unknown nodal acceleration array and "F" is the effective loads array. The solution can be carried out at element level without factorization of a matrix. One exemplary solution method is called the central difference method.

Time-marching simulation or time-domain analysis refers to an engineering analysis simulation in time domain, for example, a simulation of thermal fluid-structure interaction between the cooling fluid and the die of a metal forming press using a finite element analysis in time domain.

Beam element refers to a one-dimensional finite element defined by two end nodes. The beam carries an axial stress and three shear stresses that may vary across the cross section, when the beam is under straining force. Axial strain of the beam is defined as amount of stretch in the axial direction of the beam. For example, when a beam is stretched from original length L to an elongated length (L+δ) by a tension axial force, the axial strain ϵ is defined as the total elongation δ per unit length (i.e., ϵ=δ/L). The thermal analog to the above is that the beam carries an axial temperature gradient and material mass flow rate.

Shell element refers to a two-dimensional element defined by an area, for example, a triangular element, a quadrilateral element, etc.

Solid element refers to a three-dimensional volumetric finite element, for example, a 4-node tetrahedral element, an 8-node hexahedral element, etc.

Embodiments of the present invention are discussed herein with reference to FIGS. 2A-6. However, those skilled in the art will readily appreciate that the detailed description given herein with respect to these figures is for explanatory purposes as the invention extends beyond these limited embodiments.

Figure 2A:
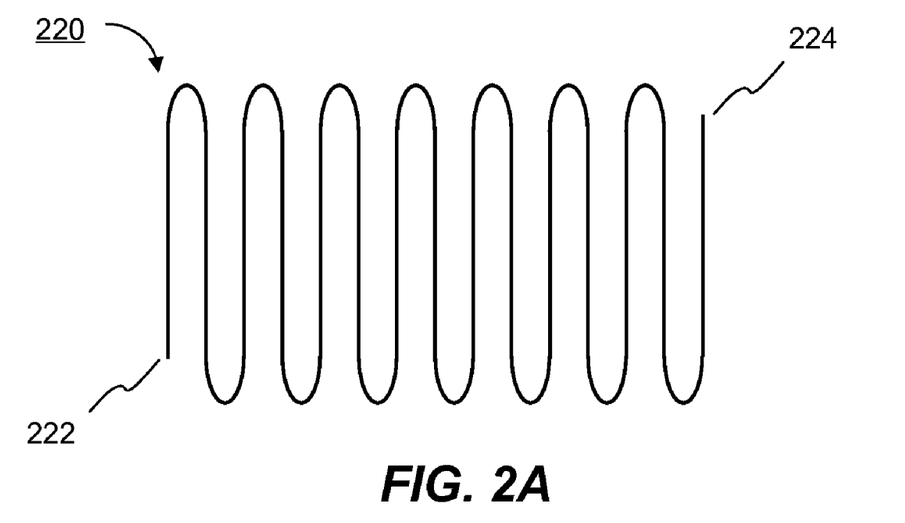
FIG. 2A is a diagram showing a first exemplary fluid flow path that may be used in accordance with one embodiment of the present invention.
Figure 2B:
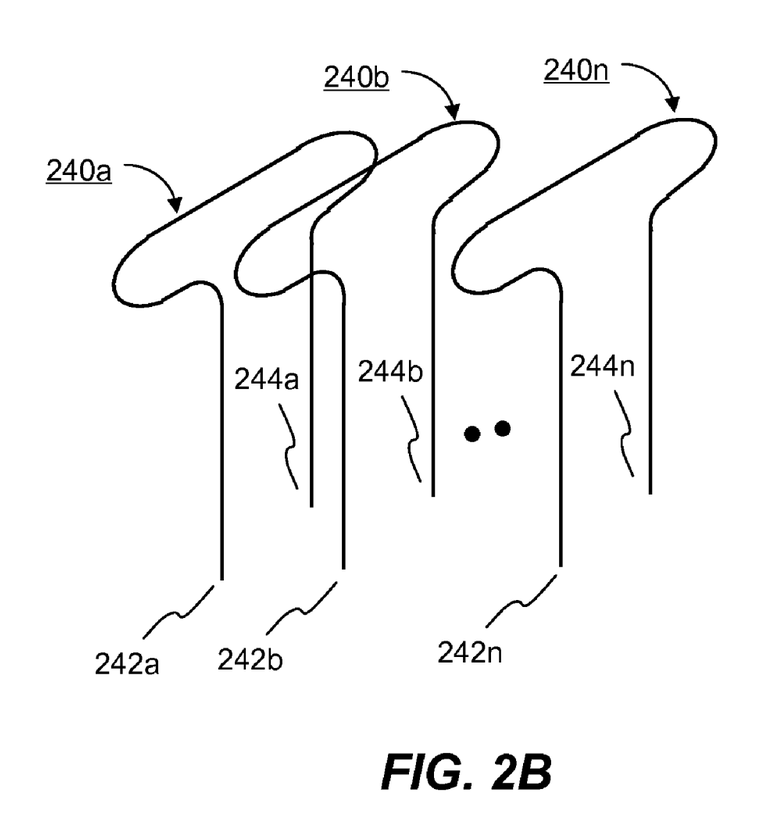
FIG. 2B is a diagram showing a plurality of second exemplary fluid flow paths that may be used in accordance with another embodiment of the present invention.

Referring first to FIG. 2A, a first exemplary flow path 220 is shown. The flow path 220 comprises an inlet 222 and an outlet 224, in which fluid enters and exits the flow path 220, respectively. In one example, the flow path 220 may represent a cooling fluid passage embedded in a structure to be cooled (e.g., the die 114 of FIG. 1). In another example, the flow path 220 may represent a cooling coil in a heat exchanger (e.g., radiator, refrigerator, etc.). FIG. 2B shows second exemplary flow paths 240a-n. Each of the flow paths 240a-n includes corresponding inlet 242a-n and outlet 244a-n. Another embodiment is that an inlet header manifold connects to all the flow inlets 242a-n and an exit header manifold connects to all the flow outlets 244a-n. The second flow paths 240a-n may be configured to cool a relatively large structure. For illustration simplicity, both the first flow path 220 and the plurality of second flow paths 240 are shown as objects orientated on a two-dimensional plane. In reality, any of the flow paths may be a passage that twists and turns in a three-dimensional space. The objective is to place the fluid passage in an orientation that is best suited for providing heat exchange efficiently and effectively. According to one aspect of the present invention, an arbitrary shaped three-dimensional fluid path is created from a definition of a number of contiguous line segments. In one embodiment, the line segments can be defined interactively by a user using a graphic user interface of a preprocessor of a finite element analysis software module.

Figure 3:
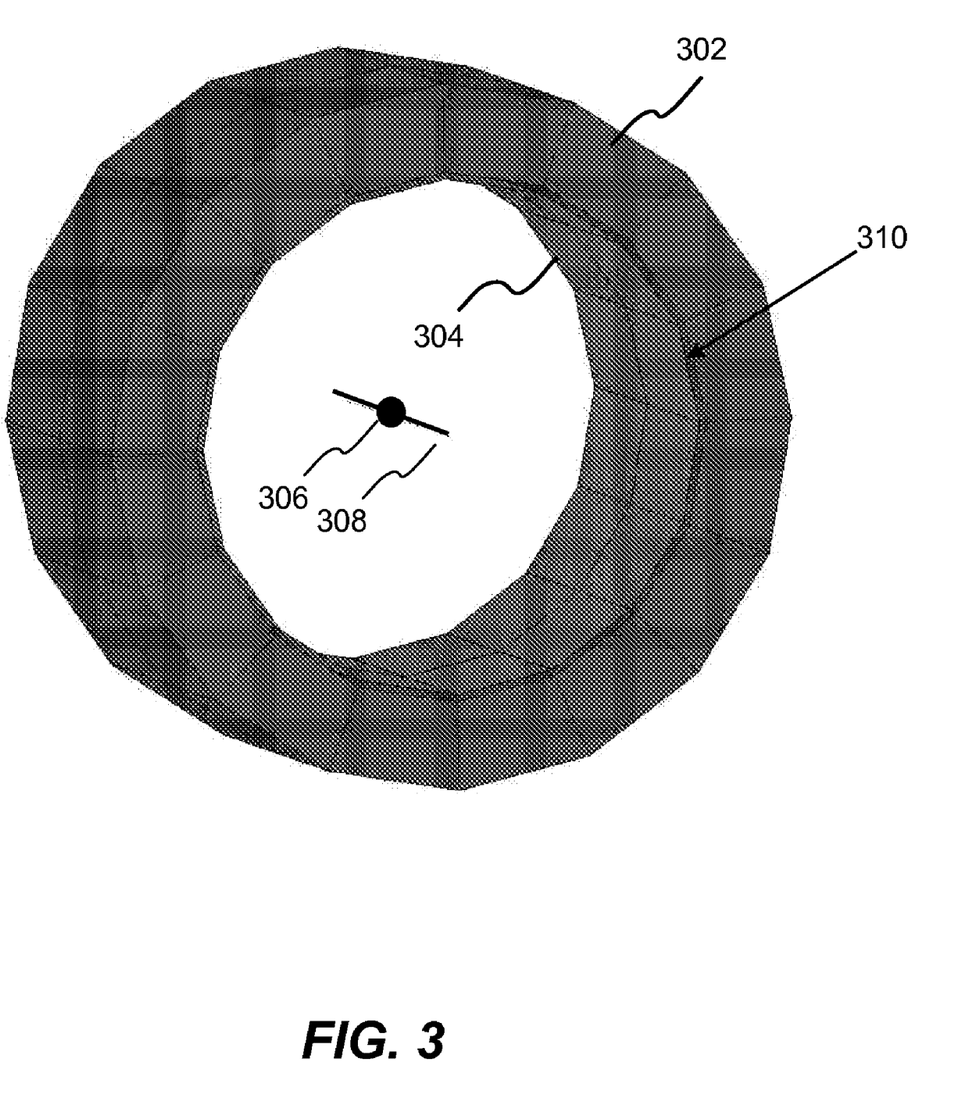
FIG. 3 is a perspective view showing an exemplary bulk flow fluid element in accordance with one embodiment of the present invention.

In order to simulate thermal interaction of the fluid along flow paths, according to an embodiment of the present invention, a special purpose finite element—bulk flow fluid element (BFFE) 300 is created as shown in FIG. 3. Each BFFE 300 comprises the following characteristics: 1) at least one surrounding layer of solid elements 302 representing either the surrounding structure or the pipe wall; 2) a layer of shell elements or Bulk Node Segments 304 representing the outer boundary of the fluid; 3) a center node or Bulk Node 306 at the center of the BFFE for defining fluid properties (e.g., density, specific heat) and volume (i.e., fluid volume is calculated as the enclosed volume between the Bulk Node and all of the Bulk Node Segments that surround it); 4) a fluid flow beam element or Bulk Node Element 308 for defining fluid flow path to another BFFE; and 5) a contact interface 310 between the solid elements and the shell elements for conducting fluid-structure thermal interaction.

With the volume and fluid properties associated with each Bulk Node 306, BFFE 300 is configured to represent a homogeneous volume or mass of fluid (e.g., fluid slug defined below in FIG. 4A at a uniform temperature. Bulk Node 306 can be defined by known methods, for example, coordinate (x,y,z) in a Cartesian coordinate system in three-dimension space, where x, y and z are real numbers and coordinate (x,y,z) uniquely defines a point in space. Each Bulk Node Segment 304 is either a quadrilateral or triangular surface area representing pipe wall or fluid passage surface, which surrounds the Bulk Node 306. Within a BFFE 300, heat exchange or thermal interaction between the Bulk Node 306 and each of the Bulk Node Segments 304 is through convection and radiation. Bulk Node Element 308 associates one BFFE 300 to another by connecting respective Bulk Nodes 306. This allows calculation of the conduction and advection thermal interaction or heat exchange between respective Bulk Nodes 306 in the flow direction.

Figure 4A:
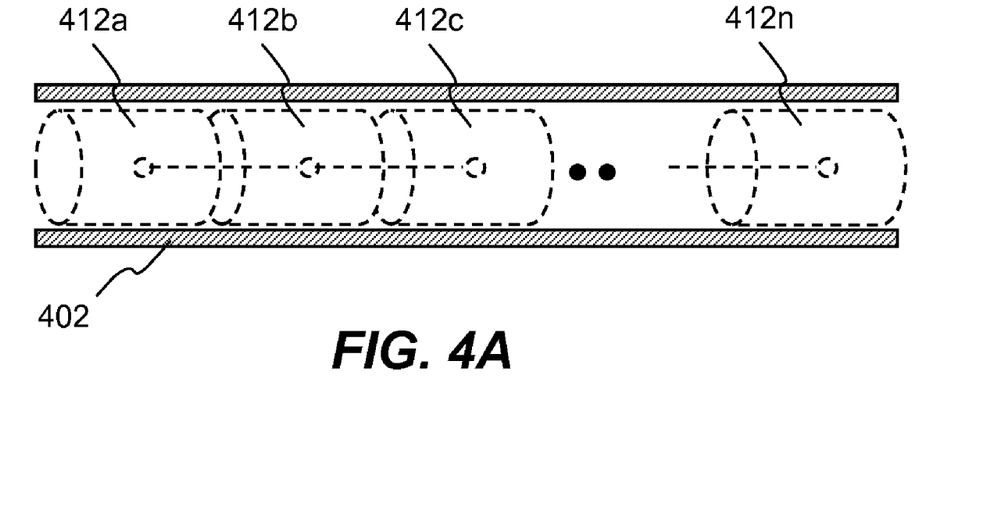
FIG. 4A is a diagram showing a plurality of exemplary fluid slugs representing fluid inside a pipe or along a flow path, according to an embodiment of the present invention.

An example of fluid along a flow path is shown in FIG. 4A, which is a diagram showing a series of fluid slugs 412a-n representing bulk flow fluid inside a pipe 402, according to an embodiment of the present invention. The pipe 402 represents a fluid flow path (e.g., first path 220, second paths 240a-n). Each of the plurality of fluid slugs 412a-n can be modeled with a respective BFFE 300. The length of each slug 412 is configured by a user or by an automated means (e.g., a software module loaded on a computer). One ordinary skill in the art would know how best to divide the fluid along a flow path to achieve the objective of simulating thermal fluid-structure interaction to design a structure. For example, certain portion of the flow path may require more BFFES due to higher rates of heat exchange.

Figure 4B:
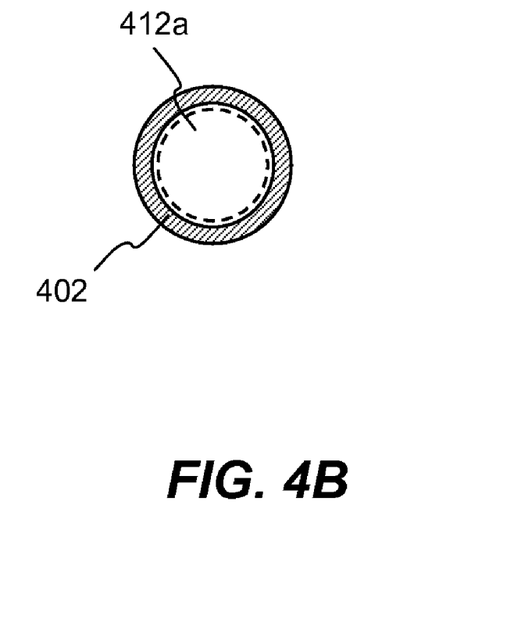
FIG. 4B is a cross-section view showing, in axial direction, the exemplary bulk fluid flow path of FIG. 4A.

Although the fluid slugs 412a-n may appear to have the same size in FIG. 4A, the fluid slug 412a-n may have different size from each other. An axial direction view of the pipe 402 is shown in FIG. 4B. The circular cross-section of the pipe 402 is just an example. Any other closed shape (e.g., ellipse, triangle, quadrilateral, or irregular polygon) is permitted in the present invention.

Thermal interaction between each slug 412a-n (represented by Bulk Node Segments 304) and the pipe wall or surrounding structure (represented by solid elements 302) is conducted via the contact interface 310 of the BFFE 300. The heat exchange between two fluid slugs associated by the fluid beam element 308 is via conduction and advection. To simulate continuous thermal interaction between these components, a time-marching or time-domain analysis is conducted using a finite element analysis software module. The time-marching analysis comprises a number of solution cycles. At each solution cycle, the thermal interactions of each BFFE and between two associated BFFEs are calculated. As a result, a time history of thermal interactions is calculated and evaluated for designing a heat exchange system (e.g., a set of cooling passages for a die in a metal-forming press).

Figure 5A:
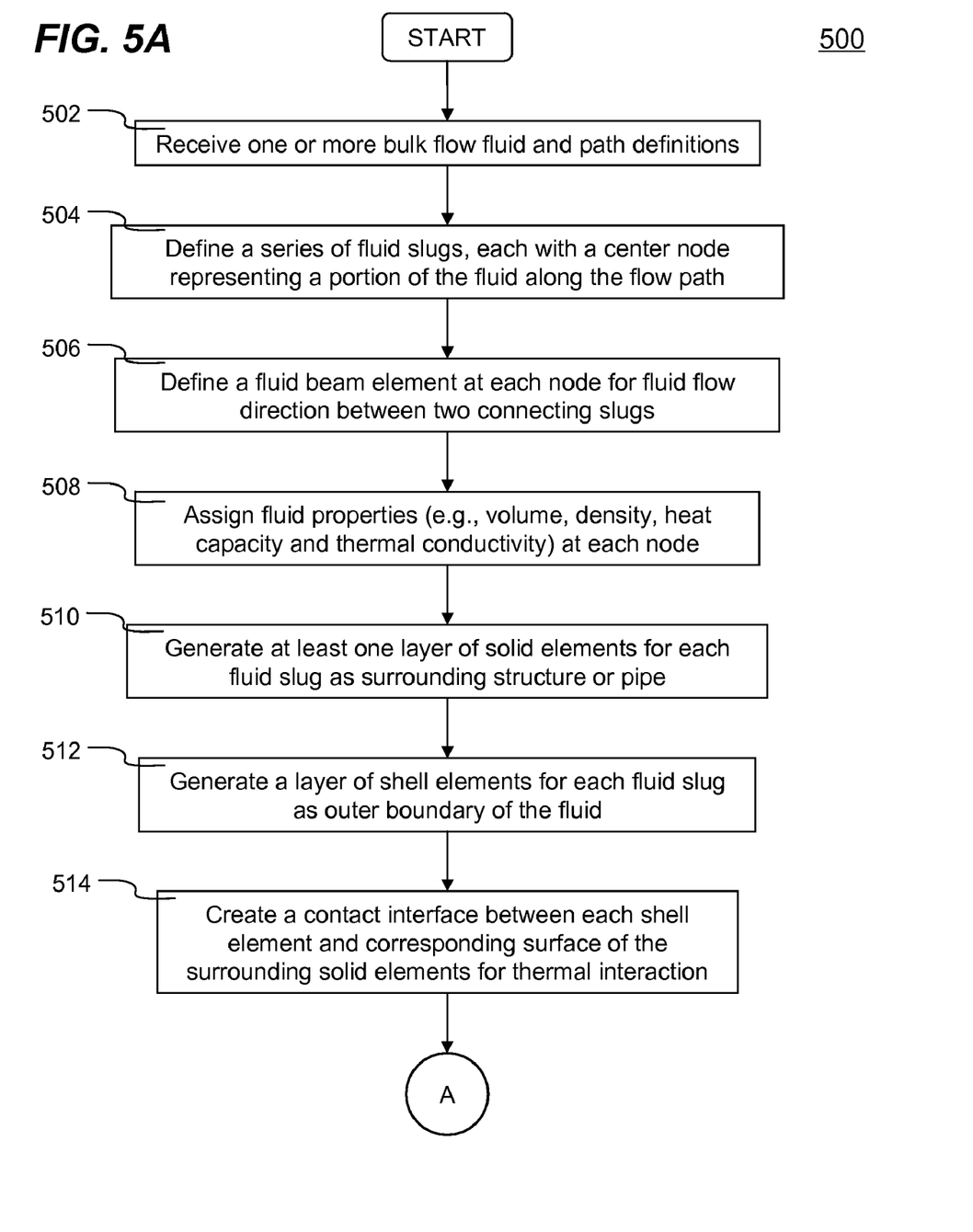
FIGS. 5A and 5B collectively show a flowchart illustrating an exemplary process of simulating thermal fluid-structure interaction using bulk flow fluid element in a finite element analysis of a structure, according to an embodiment of the present invention.
Figure 5B:
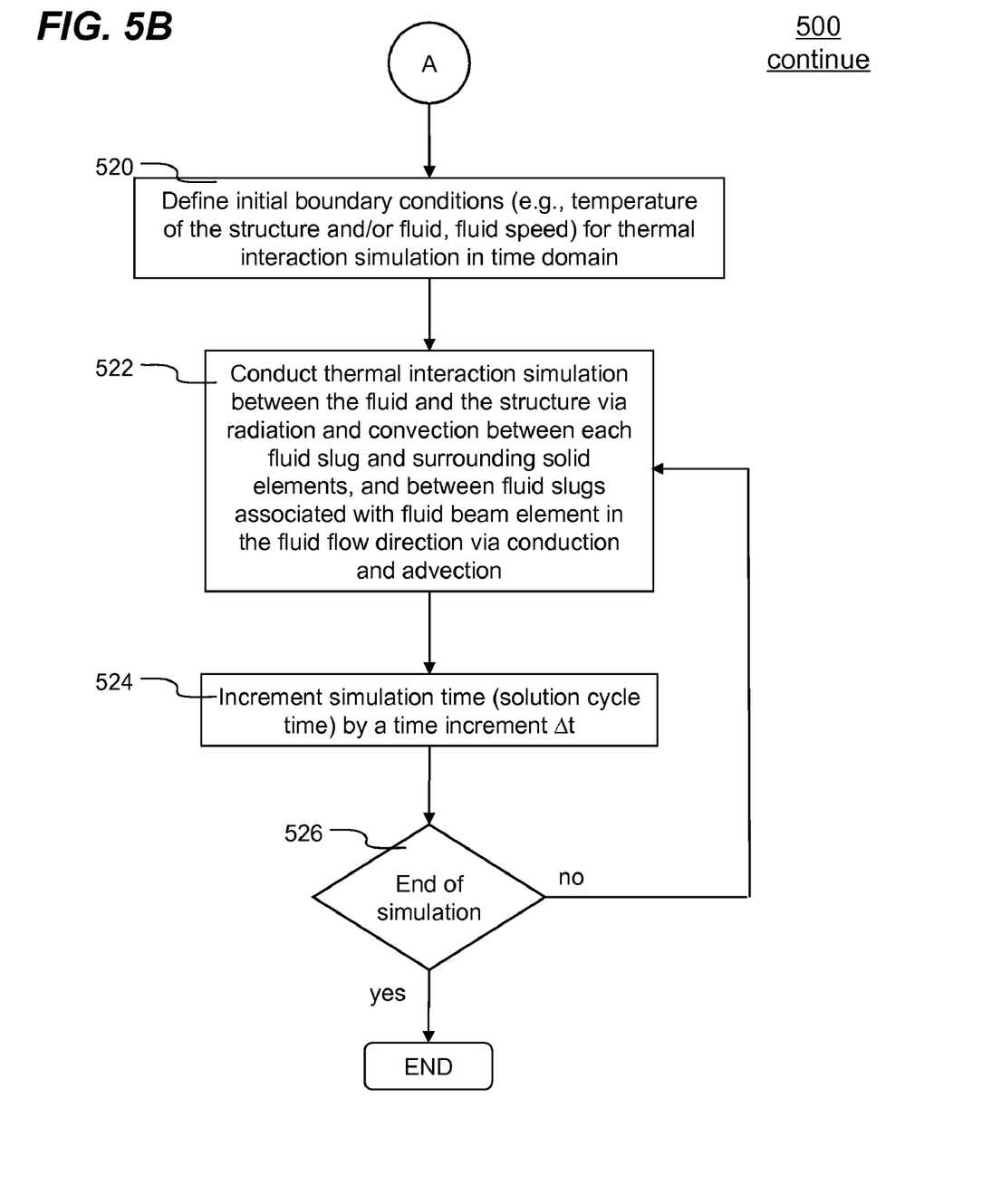

Referring now to FIGS. 5A and 5B, a flowchart is collectively shown to illustrate an exemplary process 500 of simulating thermal fluid-structure interaction using bulk flow fluid element in a finite element analysis of a structure, according to an embodiment of the present invention. Process 500 may be implemented in software and preferably understood in conjunction with previous figures.

Process 500 starts by receiving a bulk flow fluid and path definition at step 502, for example, placement of cooling passage in a die of a metal forming press, or orientation of piping in a radiator. The bulk fluid and path definition may contain one or more bulk flow fluid paths. Each path is configured to facilitate a particular kind of fluid.

Figure 6:
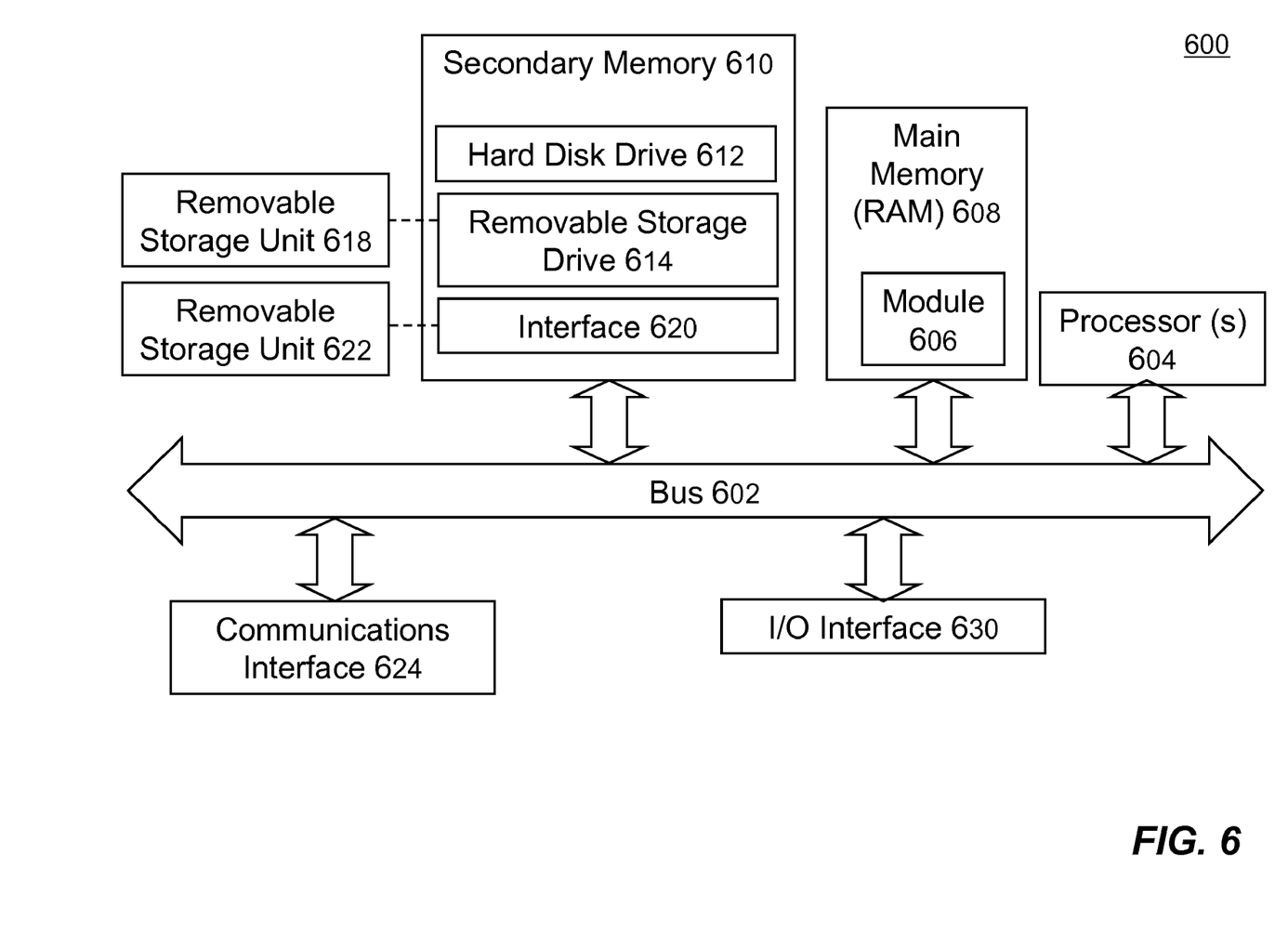
FIG. 6 is a function diagram showing salient components of a computing device, in which an embodiment of the present invention may be implemented.

The received information is fed into a finite element analysis software module (loaded on a computer's memory as described in descriptions associated with FIG. 6 below) either directly or indirectly via well known methods. An exemplary well known method is to utilize a pre-processing software module with graphic user interface. Another well known method is to manually enter the received definitions according to a predefined input format of the finite element analysis (FEA) software module.

Next at step 504, a plurality of fluid slugs is defined along each of the received flow paths. Each slug represents a portion of the fluid along the flow path. At center of each fluid slug, a node (i.e., Bulk Node 306) is also defined. Then the fluid flow beam element (i.e., Bulk Node Element 308) is defined at step 506. The fluid flow beam element is configured to associate two connected fluid slugs and to indicate the fluid flow direction. Each fluid slug comprises a volume that can be determined by a length and a cross-section area. At step 508, fluid volume, density, specific heat and thermal conductivity of each fluid slug is assigned to the corresponding Bulk Node. The fluid properties may be received together with the fluid and flow path definition, may also be received in a separate operation.

At step 510, at least one layer of solid elements 302 for each fluid slug are generated as surrounding structure or pipe. Exemplary solid element may include hexahedron (8-node solid), tetrahedron (4-node solid), or other types of three-dimensional element. Depending upon the length of each fluid slug, the layer of solid elements may contain more than one element in the axial direction of the fluid slug (e.g., two elements are shown in FIG. 3). At step 512, a layer of shell elements (i.e., Bulk Node Segments 304) are generated as outer boundary of each fluid slug. Similar to the solid elements, the shell elements may contain triangular element, quadrilateral element, or other types of two-dimensional surface element. Then, at step 514, a contact interface 310 is created between each shell element 304 and the corresponding inner surface of respective solid element 302. The contact interface 310 is configured to conduct heat exchange or thermal interaction between the fluid (represented by shell elements) and the structure (represented by solid elements).

After step 514, each of the fluid slugs can be referred to as a bulk flow fluid element (BFFE) 300 of FIG. 3. Next, at step 520, initial boundary condition (e.g., temperature of structure, temperature of fluid at inlet or outlet, fluid speed through the flow path, etc.) is defined such that a thermal fluid-structure interaction simulation can be performed in a time domain, for example, a time-marching analysis with a number of solution cycles.

The thermal fluid-structure interaction simulation is then conducted at a current solution cycle at step 522. The thermal interaction includes heat exchange between structure and fluid for each BFFE through radiation and convection, and between two associated BFFEs through conduction and advection in the flow direction. After the solution is completed in the current solution cycle, the simulation time is incremented by a time increment ($\Delta t$) at step 524. In other words, the current solution cycle is advanced in time. Next at decision 526, it is determined whether the simulation has been finished through a known method. For example, the simulation time at the current solution cycle is compared with a predefined total simulation time, if the current solution cycle time has reached the total simulation time, then the simulation has reached the end.

If 'no' at decision 526, process 500 moves back to step 522 to repeat another thermal fluid-structure interaction simulation until decision 526 becomes 'yes' and process 500 ends.

Process 500 is configured for performing a time-marching thermal fluid-structure interaction simulation for one configuration of a structure. For example, a particular set of cooling passages of a die in a metal forming press is simulated and analyzed. Any new improvement or adjustment may be made to the arrangement or placement (i.e., the fluid and flow path definition) of the cooling fluid passages thereafter. Another simulation can then be performed for the adjusted configuration until a desired configuration has been reached subject to a predefined criterion (e.g., cooling can be achieved in certain amount of time).

According to one aspect, the present invention is directed towards one or more computer systems capable of carrying out the functionality described herein. An example of a computer system 600 is shown in FIG. 6. The computer system 600 includes one or more processors, such as processor 604. The processor 604 is connected to a computer system internal communication bus 602. Various software embodiments are described in terms of this exemplary computer system. After reading this description, it will become apparent to a person skilled in the relevant art(s) how to implement the invention using other computer systems and/or computer architectures.

Computer system 600 also includes a main memory 608, preferably random access memory (RAM), and may also include a secondary memory 610. The secondary memory 610 may include, for example, one or more hard disk drives 612 and/or one or more removable storage drives 614, representing a floppy disk drive, a magnetic tape drive, an optical disk drive, etc. The removable storage drive 614 reads from and/or writes to a removable storage unit 618 in a well-known manner. Removable storage unit 618, represents a floppy disk, magnetic tape, optical disk, etc. which is read by and written to by removable storage drive 614. As will be appreciated, the removable storage unit 618 includes a computer usable storage medium having stored therein computer software and/or data.

In alternative embodiments, secondary memory 610 may include other similar means for allowing computer programs or other instructions to be loaded into computer system 600. Such means may include, for example, a removable storage unit 622 and an interface 620. Examples of such may include a program cartridge and cartridge interface (such as that found in video game devices), a removable memory chip (such as an Erasable Programmable Read-Only Memory (EPROM), Universal Serial Bus (USB) flash memory, or PROM) and associated socket, and other removable storage units 622 and interfaces 620 which allow software and data to be transferred from the removable storage unit 622 to computer system 600. In general, Computer system 600 is controlled and coordinated by operating system (OS) software, which performs tasks such as process scheduling, memory management, networking and I/O services. Exemplary OS includes Linux®, Microsoft Windows®.

There may also be a communications interface 624 connecting to the bus 602. Communications interface 624 allows software and data to be transferred between computer system 600 and external devices. Examples of communications interface 624 may include a modem, a network interface (such as an Ethernet card), a communications port, a Personal Computer Memory Card International Association (PCMCIA) slot and card, etc. Software and data transferred via communications interface 624 are in the form of signals 628 which may be electronic, electromagnetic, optical, or other signals capable of being received by communications interface 624. The computer 600 communicates with other computing devices over a data network based on a special set of rules (i.e., a protocol). One of the common protocols is TCP/IP (Transmission Control Protocol/Internet Protocol) commonly used in the Internet. In general, the communication interface 624 manages the assembling of a data file into smaller packets that are transmitted over the data network or reassembles received packets into the original data file. In addition, the communication interface 624 handles the address part of each packet so that it gets to the right destination or intercepts packets destined for the computer 600. In this document, the terms "computer program medium" and "computer usable medium" are used to generally refer to media such as removable storage drive 614, and/or a hard disk installed in hard disk drive 612. These computer program products are means for providing software to computer system 600. The invention is directed to such computer program products.

The computer system 600 may also include an input/output (I/O) interface 630, which provides the computer system 600 to access monitor, keyboard, mouse, printer, scanner, plotter, and alike.

Computer programs (also called computer control logic) are stored as application modules 606 in main memory 608 and/or secondary memory 610. Computer programs may also be received via communications interface 624. Such computer programs, when executed, enable the computer system 600 to perform the features of the present invention as discussed herein. In particular, the computer programs, when executed, enable the processor 604 to perform features of the present invention. Accordingly, such computer programs represent controllers of the computer system 600.

In an embodiment where the invention is implemented using software, the software may be stored in a computer program product and loaded into computer system 600 using removable storage drive 614, hard drive 612, or communications interface 624. The application module 606, when executed by the processor 604, causes the processor 604 to perform the functions of the invention as described herein.

The main memory 608 may be loaded with one or more application modules 606 that can be executed by one or more processors 604 with or without a user input through the I/O interface 630 to achieve desired tasks. In operation, when at least one processor 604 executes one of the application modules 606, the results are computed and stored in the secondary memory 610 (i.e., hard disk drive 612). The status of the finite element analysis (e.g., temperature of each fluid slug) is reported to the user via the I/O interface 630 either in a text or in a graphical representation Although the present invention has been described with reference to specific embodiments thereof, these embodiments are merely illustrative, and not restrictive of, the present invention. Various modifications or changes to the specifically disclosed exemplary embodiments will be suggested to persons skilled in the art. For example, whereas BFFE has been shown with a circular cross-section, other types of closed two-dimensional geometric shapes may be used, for example, triangle, square, or quadrilateral. Furthermore, whereas only one layer of solid elements is shown in FIG. 3, more than one layer of solid elements may be defined for representing surrounding structure. In summary, the scope of the invention should not be restricted to the specific exemplary embodiments disclosed herein, and all modifications that are readily suggested to those of ordinary skill in the art should be included within the spirit and purview of this application and scope of the appended claims.

What is claimed is:

1. A method of designing a structure using a time-marching thermal fluid-structure interaction simulation in a finite element analysis comprising:

receiving a bulk flow fluid and path definition that includes one or more flow paths in the structure in a computer with a finite element analysis application module installed thereon;

defining a plurality of fluid slugs along each of the flow paths in the computer, the plurality of fluid slugs is represented by at least a first bulk flow fluid element (BFFE) and a second BFFE, wherein each of the first and second BFFEs comprises a set of thermal interaction characteristics pertinent to corresponding one of the fluid slugs, and the first BFFE and the second BFFE are connected to each other in a flow direction of said each of the flow paths; and creating a desirable configuration of the structure based on the finite element analysis's results obtained by conducting a time-marching thermal fluid-structure interaction simulation of the structure at a plurality of solution cycles, wherein the finite element analysis's results comprise effects from a first thermal interaction at said each of the first and second BFFEs and from a second thermal interaction between the first BFFE and the second BFFE at each of the solution cycles.

2. The method of claim 1, wherein said each of the flow paths comprises a continuous arbitrary three-dimensional passage with a flow inlet and a flow outlet, wherein the flow direction is from the flow inlet to the flow outlet.

3. The method of claim 1, wherein said each of the fluid slugs comprises a homogeneous volume of fluid at a uniform temperature, wherein the homogeneous volume is determined by a length and a cross-section area of said each of the fluid slugs.

4. The method of claim 3, wherein the set of thermal interaction characteristics comprises a center node, located in a center of said each fluid slugs, configured for defining the homogeneous volume, the fluid density and the specific heat of said each of the fluid slugs.

5. The method of claim 4, wherein the set of thermal interaction characteristics comprises a layer of shell elements configured for representing outer boundary of said each fluid slugs.

6. The method of claim 5, wherein the set of thermal interaction characteristics comprises at least one layer of solid elements configured for representing the structure surrounding said each of the fluid slugs.

7. The method of claim 6, wherein the set of thermal interaction characteristics comprises a layer of contact interfaces located between the shell elements and inner surface of the solid elements.

8. The method of claim 3, wherein the set of thermal interaction characteristics comprises a fluid flow beam element, situated in axial centerline of said each of the fluid slugs, configured for connecting said first BFFE and said second BFFE.

9. The method of claim 1, wherein said first thermal interaction is conducted via heat radiation and convection.

10. The method of claim 1, wherein said second thermal interaction is conducted via heat conduction and advection.

11. A system for designing a structure using a time-marching thermal fluid-structure interaction simulation in a finite element analysis comprising:

a main memory for storing computer readable code for a finite element analysis application module;

at least one processor coupled to the main memory, said at least one processor executing the computer readable code in the main memory to cause the finite element analysis application module to perform operations by a method of:

receiving a bulk flow fluid and path definition that includes one or more flow paths in the structure;

defining a plurality of fluid slugs along each of the flow paths, the plurality of fluid slugs is represented by at least a first bulk flow fluid element (BFFE) and a second BFFE, wherein each of the first and second BFFEs comprises a set of thermal interaction characteristics pertinent to corresponding one of the fluid slugs, and the first BFFE and the second BFFE are connected to each other in flow direction of said each of the flow paths; and performing a time-marching thermal fluid-structure interaction simulation of the structure at a plurality of solution cycles in the finite element analysis, wherein the time-marching thermal fluid-structure interaction simulation's result includes effects from a first thermal interaction at said each of the first and second BFFEs and from a second thermal interaction between the first BFFE and the second BFFE at each of the solution cycles, whereby a desirable configuration of the structure can be designed based on the result.

12. The system of claim 11, wherein said each of the fluid slugs comprises a homogeneous volume of fluid at a uniform temperature, wherein the homogeneous volume is determined by a length and a cross-section area of said each of the fluid slugs.

13. The system of claim 12, wherein the set of thermal interaction characteristics comprises a layer of shell elements configured for representing outer boundary of said each fluid slugs.

14. The system of claim 13, wherein the set of thermal interaction characteristics comprises at least one layer of solid elements configured for representing the structure surrounding said each of the fluid slugs.

15. The system of claim 14, wherein the set of thermal interaction characteristics comprises a layer of contact interfaces located between the shell elements and inner surface of the solid elements.

16. The system of claim 11, wherein the set of thermal interaction characteristics comprises a fluid flow beam element, situated in axial centerline of said each of the fluid slugs, configured for connecting said first BFFE and said second BFFE.

17. A computer-readable storage medium containing instructions for controlling a computer system to perform a time-marching thermal fluid-structure interaction simulation in a finite element analysis by a method comprising:

receiving a bulk flow fluid and path definition that includes one or more flow paths in the structure in a computer;

defining a plurality of fluid slugs along each of the flow paths in the computer, the plurality of fluid slugs is represented by at least a first bulk flow fluid element (BFFE) and a second BFFE, wherein each of the first and second BFFEs comprises a set of thermal interaction characteristics pertinent to corresponding one of the fluid slugs, and the first BFFE and the second BFFE are connected to each other in flow direction of said each of the flow paths; and performing a time-marching thermal fluid-structure interaction simulation of the structure at a plurality of solution cycles in the finite element analysis, wherein the time-marching thermal fluid-structure interaction simulation's result includes effects from a first thermal interaction at said each of the first and second BFFEs and from a second thermal interaction between the first BFFE and the second BFFE at each of the solution cycles, whereby a desirable configuration of the structure can be designed based on the result.

18. The computer-readable storage medium of claim 17, wherein said each of the fluid slugs comprises a homogeneous volume of fluid at a uniform temperature, wherein the homogeneous volume is determined by a length and a cross-section area of said each of the fluid slugs.

19. The computer-readable storage medium of claim 18, wherein the set of thermal interaction characteristics comprises a center node, located in a center of said each fluid slugs, configured for defining the homogeneous volume, the fluid density and the specific heat of said each of the fluid slugs.

20. The computer-readable storage medium of claim 17, wherein the set of thermal interaction characteristics comprises a fluid flow beam element, situated in axial centerline of said each of the fluid slugs, configured for connecting said first BFFE and said second BFFE.

* * * * *